(12) United States Patent
Ka et al.

(10) Patent No.: US 9,990,539 B2
(45) Date of Patent: Jun. 5, 2018

(54) METHOD AND DEVICE FOR RECOGNIZING IMAGE

(71) Applicant: INDUSTRY-ACADEMIC COOPERATION FOUNDATION, YONSEI UNIVERSITY, Seoul (KR)

(72) Inventors: Min Ho Ka, Seoul (KR); Ji Woong Yu, Incheon (KR)

(73) Assignee: INDUSTRY-ACADEMIC FOUNDATION, YONSEI UNIVERSITY, Seoul (KR)

( * ) Notice: Subject to any disclaimer, the term of this patent is extended or adjusted under 35 U.S.C. 154(b) by 26 days.

(21) Appl. No.: 14/930,530

(22) Filed: Nov. 2, 2015

(65) Prior Publication Data
US 2016/0125230 A1 May 5, 2016

(30) Foreign Application Priority Data
Nov. 4, 2014 (KR) .......................... 10-2014-0152375

(51) Int. Cl.
*G06K 9/00* (2006.01)
*G06K 9/62* (2006.01)

(52) U.S. Cl.
CPC ....... *G06K 9/00288* (2013.01); *G06K 9/6247* (2013.01)

(58) Field of Classification Search
None
See application file for complete search history.

(56) References Cited

U.S. PATENT DOCUMENTS 8,406,525 B2 * 3/2013 Ma ..................... G06K 9/00275
382/159

FOREIGN PATENT DOCUMENTS

| KR | 10-2006-0003666 A | 1/2006 |
| KR | 10-2012-0089504 A | 8/2012 |
| KR | 10-2013-0132221 A | 12/2013 |

OTHER PUBLICATIONS

Wright, John, et al. "Robust face recognition via sparse representation." IEEE transactions on pattern analysis and machine intelligence 31.2 (2009): 210-227.*

(Continued)

*Primary Examiner* — Manav Seth
*Assistant Examiner* — David Perlman (57) ABSTRACT

An image recognition method and device are disclosed. The disclosed device may include: a reference image storage unit configured to convert reference images into 1-dimensional vectors and store the converted 1-dimensional vectors; an image acquisition unit configured to obtain an input image; an image converter unit configured to convert the input image into a 1-dimensional vector, apply dimension reduction, and calculate coefficients for expressing the input image as a linear sum of vectors forming a reference image for each of the reference images; and a determiner unit configured to determine a reference image corresponding to the input image by performing a subtraction computation of subtracting a value obtained by applying the coefficients calculated for each reference image to a relevant reference image from the converted input image. The invention makes it possible to perform image recognition at a fast speed and lower the likelihood of the users' privacy being invaded.

6 Claims, 4 Drawing Sheets

(56) References Cited

OTHER PUBLICATIONS

Langer, Michael, "Least square CIM (McGill) Comp 558 lecture 18", Nov. 17, 2010, [retrieved on Oct. 1, 2017], Retrieved from the Internet <URL: http://www.cim.mcgill.ca/~anger/558/18-leastsquares.pdf>.*

* cited by examiner

METHOD AND DEVICE FOR RECOGNIZING IMAGE

CROSS-REFERENCE TO RELATED APPLICATIONS

This application claims the benefit of Korean Patent Application No. 10-2014-0152375, filed with the Korean Intellectual Property Office on Nov. 4, 2014, the disclosure of which is incorporated herein by reference in its entirety.

BACKGROUND OF THE INVENTION

1. Technical Field

The present invention relates to a method and a device for recognizing images.

2. Description of the Related Art

Together with advances in electronic equipment and communication technology, there are rapid changes also in the field of authentication for permitting entry or use. The authentication of a user is performed by a variety of methods for providing authorization to enter a particular area, use a particular device, and the like.

One of the most representative authentication methods involves checking whether or not a certain body part of a person matches a pre-stored reference image.

For example, a commonly used method is to photograph and store beforehand a particular body part that is unique to a person, such as the face, a fingerprint, an iris, etc., and then comparing the stored reference image with an image of the body part obtained by a camera to determine whether or not the person is an authorized user.

This type of authentication method requires obtaining and comparing images, and as this requires a considerable amount of computation, an expensive processor as well as a relatively long processing time may be needed.

Also, since the image obtained from the camera is not always obtained from the same angle as that of the reference image, there may also be problems in the stability of the processing.

Furthermore, storing the images of users' body parts in the system may pose a problem in terms of protecting privacy.

SUMMARY OF THE INVENTION

An embodiment of the invention provides an image recognition device and method that allow image recognition at a fast speed.

Also, an embodiment of the invention provides an image recognition device and method that stores the reference images in a converted form so as to lower the possibility of the users' privacy being invaded.

To achieve the objectives above, an embodiment of the invention provides an image recognition device that includes: a reference image storage unit configured to convert reference images into 1-dimensional vectors and store the converted 1-dimensional vectors; an image acquisition unit configured to obtain an input image; an image converter unit configured to convert the input image into a 1-dimensional vector, apply dimension reduction, and calculate coefficients for expressing the input image as a linear sum of vectors forming a reference image for each of the reference images; and a determiner unit configured to determine a reference image corresponding to the input image by performing a subtraction computation of subtracting a value obtained by applying the coefficients calculated for each reference image to a relevant reference image from the converted input image.

The reference image storage unit may store the reference images to which dimension reduction has been applied after the conversion into 1-dimensional vectors.

The dimension reduction can be performed using a random matrix.

The determiner unit may perform the subtraction computation for each of the reference images and may determine the reference image corresponding to the lowest difference value as the reference image corresponding to the input image.

The image converter unit may calculate the coefficients by using the least squares method.

The coefficients may be calculated by using the equations shown below:

$$\hat{x}_C(i) = ((RA_i)^T(RA_i))^{-1}(RA_i)^T\bar{y}$$

$$A = [A_1 A_2 \ldots A_k]^T$$

$$\hat{x}_C = [\hat{x}_C(1)\hat{x}_C(2) \ldots \hat{x}_C(k)]^T$$

where $\hat{x}_c$ represents a coefficient set, $\hat{x}_c(i)$ represents a coefficient for an i-th reference image, R represents a random matrix, A represents a reference image, $A_i$ represents an i-th reference image, and $\bar{y}$ represents an input image after dimension reduction.

Another aspect of the invention provides an image recognition method that includes: (a) storing reference images into 1-dimensional vectors and storing the 1-dimensional vectors; (b) obtaining an input image; (c) converting the input image into a 1-dimensional vector, applying dimension reduction, and calculating coefficients for expressing the input image as a linear sum of vectors forming a reference image for each of the reference images; and (d) determining a reference image corresponding to the input image by performing a subtraction computation of subtracting a value obtained by applying the coefficients calculated for each reference image to a relevant reference image from the input image converted in said step (c).

With an embodiment of the invention, it is possible to perform image recognition at a fast speed, and it is possible to lower the likelihood of the users' privacy being invaded by storing the reference images in a converted form.

Additional aspects and advantages of the present invention will be set forth in part in the description which follows, and in part will be obvious from the description, or may be learned by practice of the invention.

DETAILED DESCRIPTION OF THE INVENTION

As the present invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In describing the drawings, like reference numerals are used for like elements.

Certain embodiments of the invention are described below in more detail with reference to the accompanying drawings.

Figure 1:
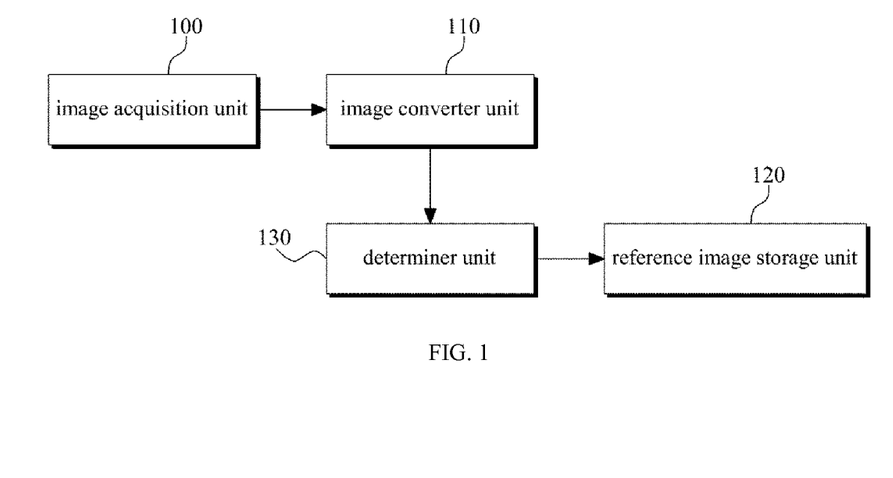
FIG. 1 illustrates the overall structure of an image recognition device according to an embodiment of the invention.

FIG. 1 illustrates the overall structure of an image recognition device according to an embodiment of the invention.

Referring to FIG. 1, an image recognition device according to an embodiment of the invention can include an image acquisition unit 100, an image converter unit 110, a reference data storage unit 120, and a determiner unit 130.

An image recognition device according to an embodiment of the invention may be an image recognition device used for security purposes, etc., and may identify input images. For example, it may operate to identify whether or not a person is an authenticated user by comparing an input image with a pre-stored reference image.

An image recognition device according to an embodiment of the invention can be used, for example, when determining whether or not entry is permitted for a person at an entrance, or when determining whether or not a user attempting a payment or some other financial transaction is authorized to do so.

The image recognition device based on an embodiment of the invention may compare an input image with a pre-stored reference image to identify the input image, and in doing so, may convert the acquired images (including the input images and the reference images) so that the comparison procedure can be performed with simple computations and the stability of the processing can be improved.

A description is provided below, with reference to FIG. 1, of the composition of an image recognition device according to an embodiment of the invention.

The image acquisition unit 100 may serve to obtain input images or reference images for identification. A reference image refers to the image stored beforehand for the authentication, while an input image refers to the image inputted for the authentication.

Of course, the reference image does not have to be obtained via the image acquisition unit 100 of the image recognition device; it can be obtained via another route to be provided to and stored in the image recognition device based on an embodiment of the invention.

The present embodiment is described supposing that both the input image and the reference image can be obtained by the image acquisition unit 100, but it should be apparent to those skilled in the art that the reference image can be obtained by a separate means of image acquisition other than the image acquisition unit 100 of the image recognition device and provided to the image recognition device.

The image acquisition unit 100 may include any of a variety of image sensors such as a camera and a CCD, and may generate image data for the obtained image by way of a particular encoding procedure.

The image date generated at the image acquisition unit 100 may be 2-dimensional pixel data, and the size of the pixel data may be determined according to the resolution.

The image acquisition unit 100 can obtain an image of any of a variety of targets, such as a person's face, fingerprint, iris, etc., for use in performing the authentication.

The image converter unit 110 may serve to convert the image obtained at the image acquisition unit. The image converter unit can perform a conversion procedure on both the input image and the reference image.

The present invention takes advantage of the fact that, when an input image is expressed as a linear sum of vectors forming the reference image data, the coefficients applied to the linear sum has sparse characteristics.

Sparse characteristics mean that from a given set of data, only some of the values have specific values and the majority of the remaining values have a value of 0.

The present invention performs the image conversion by using such sparse characteristics. A description now follows, with reference to FIG. 2, on the detailed structure of the image converter unit.

Figure 2:
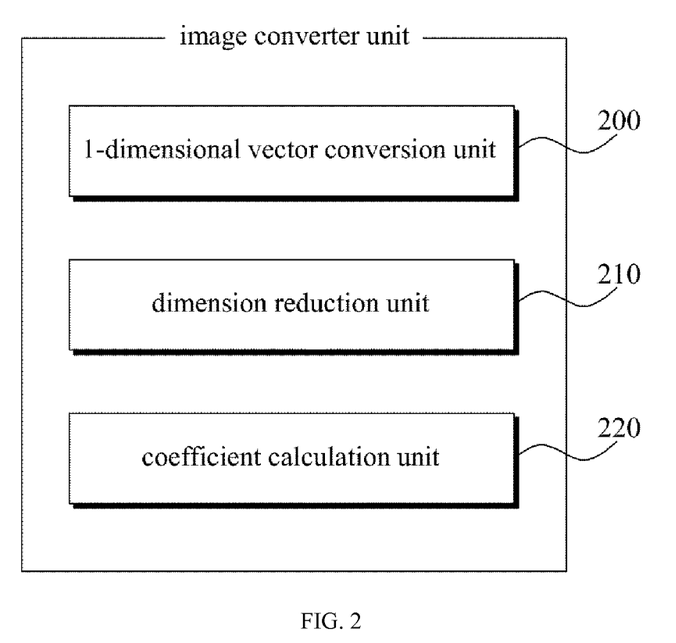
FIG. 2 is a block diagram illustrating the module structure of an image converter unit according to an embodiment of the invention.

FIG. 2 is a block diagram illustrating the module structure of an image converter unit according to an embodiment of the invention.

Referring to FIG. 2, the image converter unit according to an embodiment of the invention may include a 1-dimensional vector conversion unit 200, a dimension reduction unit 210, and a coefficient calculation unit 220.

The 1-dimensional vector conversion unit 200 may convert the 2-dimensional image data generated at the image acquisition unit 100 into a 1-dimensional vector. For example, the image converter unit can convert the 2-dimensional data into a 1-dimensional vector by arranging the pixel data of the second row of the image data continuously after the pixel data of the first row and so on.

The present invention assumes that the input image data converted to a 1-dimensional form can be expressed as a linear sum of the vectors forming the reference image data (v). Here, the reference image data (v) may also take the form of a vector, and the following Equation 1 shows an example of an input image expressed as a linear sum of the vectors that form the reference image data.

$$y = \alpha_{i,1}v_{i,1} + \alpha_{i,1}v_{i,1} + \ldots + \alpha_{i,n_i}v_{i,n_i} \quad \text{[Equation 1]}$$

In Equation 1 above, α represents a coefficient, and v represents a vector for the reference image data. Also, in Equation 1, i represents an identification number for the reference image.

For example, suppose that the number of reference image data is k, meaning that there are k valid authentication targets. Thus, the reference image data can be expressed as K sets of reference image data, as expressed by the first equation in Equation 2 shown below.

Also, each reference image data can be expressed as a set of multiple vectors. For example, the set of vectors of the first reference image data may be expressed as the second equation of Equation 2 shown below.

$$A = [A_1, A_2, \ldots, A_k]^T$$

$$A_1 = [v_{1,1}, v_{1,2}, \ldots, v_{1,n_k}]^T \quad \text{[Equation 2]}$$

Here, the input image y can be expressed by the reference image data as Equation 3 shown below.

$$y=Ax \quad \text{[Equation 3]}$$

In Equation 3 above, x represents the coefficients corresponding to the i-th reference image data. If the input image is an image corresponding to the first reference image, it would have specific values for the coefficients of the first reference image but would have values of mostly 0 for other reference images.

Therefore, when the input image is expressed as a linear sum of reference image data, the set of coefficients applied thereto can be said to have sparse characteristics.

An embodiment of the present invention applies dimension reduction to the image data, taking advantage of the fact that, due to the sparse characteristics, recovery can be performed easily after the dimension reduction on the data.

The dimension reduction unit 210 may reduce the dimension of the image data converted into 1-dimensional vectors. According to an embodiment of the invention, the dimension of the image data converted into 1-dimensional vectors may be reduced by using a random matrix. The dimension reduction using a random matrix is publicly known technology, and as such, is not described here in detail.

Of course, it should be apparent to the skilled person that the dimension reduction can also be performed by applying a method other than that using a random matrix.

For example, if the dimension of the input image converted into 1-dimensional vectors is m, the dimension reduction unit 210 may reduce the dimension to d (d<<m). If certain data has sparse characteristics, recovery is possible even after such dimension reduction.

The 1-dimensional image data having its dimension reduced can be expressed as Equation 4 shown below.

$$y=Ry=RAx \quad \text{[Equation 4]}$$

In Equation 4 above, R represents a random matrix. When the dimension reduction for the 1-dimensional image data is performed, the coefficient calculation unit 220 may calculate the coefficients for expressing the 1-dimensional image data of the input image of which the dimension has been reduced as a linear sum of vectors forming the reference image data. The coefficient calculation unit 220 may calculate the coefficients for each reference image. For example, the coefficients for expressing a first reference image as a linear sum of vectors and the coefficients for expressing a second reference image as a linear sum of vectors can be calculated separately.

Of course, the reference image data for calculating the coefficients here may also be 1-dimensional image data that has had its dimension reduced.

According to an embodiment of the invention, the coefficient calculation unit 220 may calculate the coefficients for each reference image by using the method of least squares. The least squares method is publicly known, and as such, is not described here in detail.

An example of calculating the coefficients using the method of least squares can be expressed as shown in Equation 5 below.

$$\hat{x}_C(i)=((RA_i)^T(RA_i))^{-1}(RA_i)^T\bar{y}$$

$$A=[A_1 A_2 \ldots A_k]^T$$

$$\hat{x}_C=[\hat{x}_C(1)\hat{x}_C(2)\ldots \hat{x}_C(k)]^T \quad \text{[Equation 5]}$$

The coefficient $\hat{x}_c$ calculated by Equation 5 above is a coefficient for expressing the 1-dimensional input image data that has had its dimension reduced as a linear sum of the vectors forming the 1-dimensional reference image data that has had its dimension reduced, and is different from the coefficient x expressed in Equation 1. In Equation 5 above, $\hat{x}_c(i)$ represents the coefficient for the i-th reference image, and $\bar{y}$ represents the input image that has undergone dimension reduction.

The reference image storage unit 120 may store the reference image data. According to an embodiment of the invention, the reference image data that has had its dimension reduced and has been converted 1-dimensionally may be stored in the reference image storage unit 120. Of course, the reference image storage unit 120 can also store the reference image data before conversion together.

The determiner unit 130 may serve to determine which of the reference images the input image corresponds to.

Figure 3:
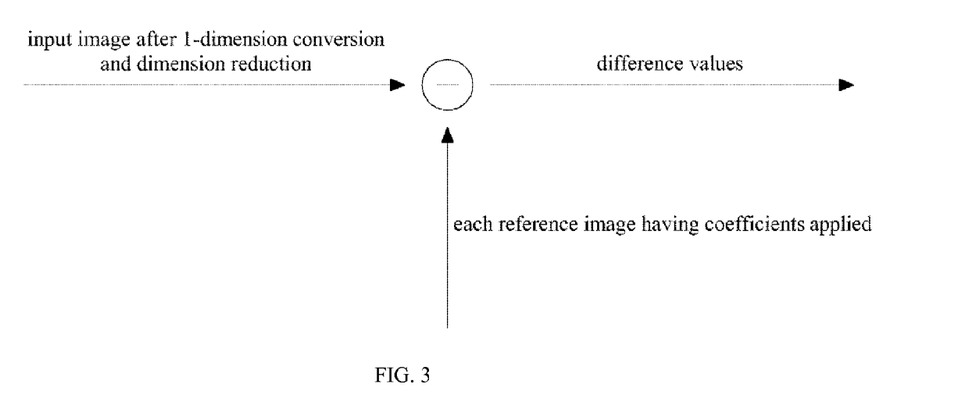
FIG. 3 illustrates the operating structure of a determiner unit in an image recognition device according to an embodiment of the invention.

FIG. 3 illustrates the operating structure of a determiner unit in an image recognition device according to an embodiment of the invention.

The determiner unit 130 may perform a subtraction computation on the input image data 300, which has been converted by the image converter unit 110, and the values obtained after applying the calculated coefficients on the reference images 310, which have had the dimension reduction and the 1-dimension conversion have been applied and which are stored in the reference image storage unit 120. The determiner unit 130 may then determine that the input image corresponds to the reference image data that yields the smallest difference value.

Specifically, the value obtained by applying the coefficients for the first reference image to the first reference image may be subtracted from the input image to which the 1-dimensional conversion and dimension reduction have been applied. This subtraction computation may be performed for all of the reference images.

Of course, the determiner unit 130 can determine that the input image does not correspond to any of the reference images if the difference value between the input image and each of the reference images to which the coefficients have been applied exceeds a pre-set threshold.

According to an embodiment of the invention, Equation 6 shown below can be used to determine which reference image the input image corresponds to.

$$\min_i C_i = |y - RA_i(\hat{x}_C(i))|_2 \quad \text{[Equation 6]}$$

Figure 7:
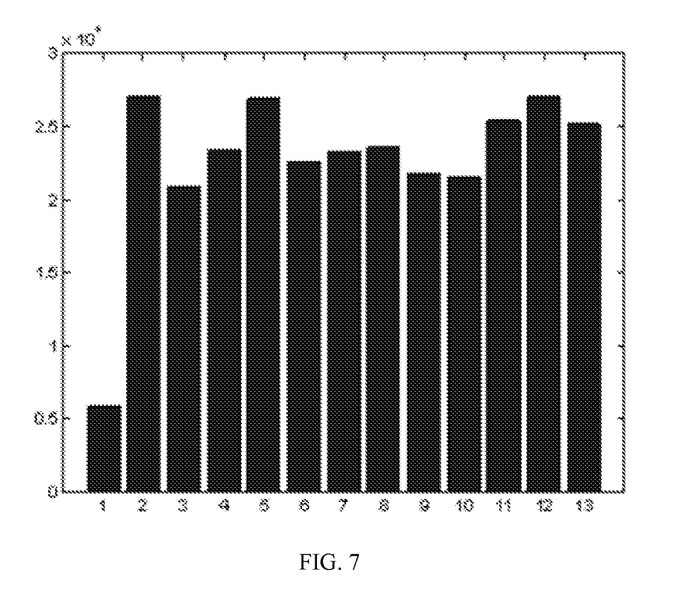
FIG. 7 is a histogram illustrating examples of difference values between an inputted image and a reference image as computed at the determiner unit.

FIG. 7 is a histogram illustrating examples of difference values between an inputted image and a reference image as computed at the determiner unit.

Referring to FIG. 7, a histogram is shown that represents the difference values between thirteen reference images and an input image.

In FIG. 7, the first reference image yields the smallest difference value, and therefore the determiner unit 130 may determine that the input image corresponds to the first reference image.

Figure 4:
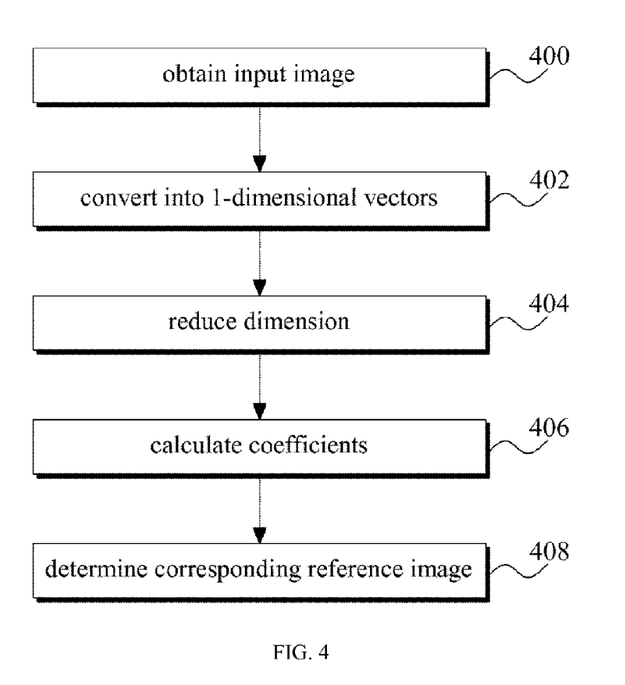
FIG. 4 is a flowchart illustrating the flow in an image recognition method according to an embodiment of the invention.

FIG. 4 is a flowchart illustrating the flow in an image recognition method according to an embodiment of the invention.

Referring to FIG. 4, an operation of obtaining an input image may first be performed (operation 400). The obtaining of the input image can be performed by using any of a variety of image acquisition devices such as a camera, etc.

As described above, a person's face, fingerprint, iris, etc., can be obtained as an input image.

When the input image is obtained, the obtained input image data may be converted into 1-dimensional vectors (operation 402).

When the conversion into 1-dimensional vectors is performed, a dimension reduction may be performed, to reduce the dimension of the 1-dimensional vectors (and hence decrease the data size) (operation 404). As described above, the dimension reduction can be performed by using a random matrix, but various known data reduction methods other than those using a random matrix can also be applied.

When the dimension reduction is performed, the coefficients for expressing the input image data, obtained by performing the dimension reduction and the 1-dimension conversion on the vectors forming each of the reference images, may be calculated (operation 406).

The reference image data obtained after the dimension reduction and the 1-dimension conversion may be stored in the reference image storage unit 120, where such reference image data may include a multiple number of vectors.

The coefficients calculated in operation 406 are coefficients for expressing the input image, after the dimension reduction and the 1-dimensional conversion, as a linear sum of the vectors forming the reference images. The coefficients can be calculated for each of the reference images, with the equation for calculating the coefficients expressed above in Equation 5.

When the coefficients are calculated for each reference image, the difference values between the input image that has undergone the 1-dimension conversion and the dimension reduction and the reference images to which the coefficients calculated above have been applied may be used to determine the reference image corresponding to the input image (operation 408). As described above, the reference image that yields the smallest difference value may be determined to be the reference image corresponding to the input image.

Figure 5:
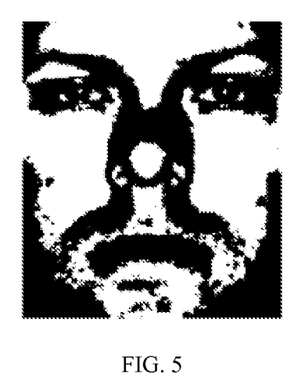
FIG. 5 illustrates an example of a reference image used in a typical image recognition device.
Figure 6:
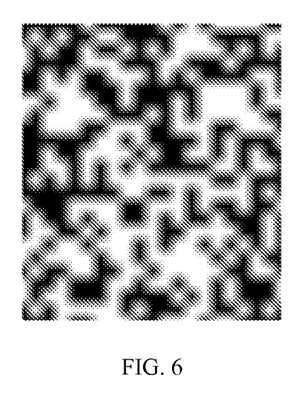
FIG. 6 illustrates an example of an image obtained after reducing the dimension of the reference image of FIG. 5 according to an embodiment of the invention.

FIG. 5 illustrates an example of a reference image used in a typical image recognition device, and FIG. 6 illustrates an example of an image obtained after reducing the dimension of the reference image of FIG. 5 according to an embodiment of the invention.

The reference image illustrated in FIG. 5 is a reference image that has not yet undergone the conversion; it may be preferable not to have the image shown in FIG. 5 stored in the reference image storage unit according to an embodiment of the invention.

FIG. 6 is the reference image to which the conversion has been applied. Whereas the image of FIG. 5 has a size of 192×168, the image of FIG. 5 which has undergone a dimension reduction has a size of 24×21. Of course, the actual form of the data is 1-dimensional.

Since the reference image data stored in the reference image storage unit 120 is in a converted form as in FIG. 6, even if the reference image data stored in the reference image storage unit were leaked, it would be difficult to perceive the type of object in the image, thereby allowing a higher level of security.

While the present invention has been described above using particular examples, including specific elements, by way of limited embodiments and drawings, it is to be appreciated that these are provided merely to aid the overall understanding of the present invention, the present invention is not to be limited to the embodiments above, and various modifications and alterations can be made from the disclosures above by a person having ordinary skill in the technical field to which the present invention pertains. Therefore, the spirit of the present invention must not be limited to the embodiments described herein, and the scope of the present invention must be regarded as encompassing not only the claims set forth below, but also their equivalents and variations.

What is claimed is:

1. An image recognition device comprising:
    a reference image storage circuit configured to convert reference images into 1-dimensional vectors and store the converted 1-dimensional vectors;
    an image acquisition circuit configured to obtain an input image;
    an image converter circuit configured to convert the input image into a 1-dimensional vector, apply dimension reduction, and calculate coefficients for expressing the input image as a linear sum of vectors forming a reference image for each of the reference images; and
    a determiner circuit configured to determine a reference image corresponding to the input image by performing a subtraction computation of subtracting a value obtained by applying the coefficients calculated for each reference image to a relevant reference image from the converted input image,
    wherein the reference image storage circuit stores reference images having undergone dimension reduction after the conversion into 1-dimensional vectors,
    wherein the image converter circuit calculates the coefficients for each reference image by using a least squares method, and
    wherein the coefficients are calculated by using equations shown below:

$$\hat{x}_c(i) = ((RA_i)^T(RA_i))^{-1}(RA_i)^T \overline{y}$$

$$A = [A_1 A_2 \ldots A_k]^T$$

$$\hat{x}_c = [\hat{x}_c(1) \hat{x}_c(2) \ldots \hat{x}_c(k)]^T$$

where $\hat{x}_c$ represents a coefficient set, $\hat{x}_c(i)$ represents a coefficient for an i-th reference image, R represents a random matrix, A represents a set of reference images, $A_i$ represents an i-th reference image, and $\overline{y}$ represents an input image after dimension reduction.

2. The image recognition device of claim 1, wherein the dimension reduction is performed using a random matrix.

3. The image recognition device of claim 1, wherein the determiner circuit performs the subtraction computation for each of the reference images and determines a reference image corresponding to a lowest difference values as a reference image corresponding to the input image.

4. An image recognition method comprising:
    (a) storing reference images into 1-dimensional vectors and storing the 1-dimensional vectors;
    (b) obtaining an input image;
    (c) converting the input image into a 1-dimensional vector, applying dimension reduction, and calculating coefficients for expressing the input image as a linear sum of vectors forming a reference image for each of the reference images; and
    (d) determining a reference image corresponding to the input image by performing a subtraction computation of subtracting a value obtained by applying the coefficients calculated for each reference image to a relevant reference image from the input image converted in said step (c),
    wherein the dimension reduction is performed using a random matrix, wherein said step (c) comprises calculating the coefficients for each reference image by using a least squares method, and wherein the coefficients are calculated by using equations shown below:

$$\hat{x}_c(i) = ((RA_i)^T(RA_i))^{-1}(RA_i)^T \bar{y}$$

$$A = [A_1 A_2 \ldots A_k]^T$$

$$\hat{x}_c = [\hat{x}_c(1)\hat{x}_c(2) \ldots \hat{x}_c(k)]^T$$

where $\hat{x}_c$ represents a coefficient set, $\hat{x}_c(i)$ represents a coefficient for an i-th reference image, R represents a random matrix, A represents a set of reference images, $A_i$ represents an i-th reference image, and $\bar{y}$ represents an input image after dimension reduction.

5. The image recognition method of claim 4, wherein said step (a) comprises storing reference images having undergone dimension reduction after the conversion into 1-dimensional vectors.

6. The image recognition method of claim 5, wherein said step (d) comprises performing the subtraction computation for each of the reference images and determining a reference image corresponding to a lowest difference value as a reference image corresponding to the input image.

* * * * *